(12) United States Patent
Azzopardi

(10) Patent No.: US 10,065,343 B2
(45) Date of Patent: Sep. 4, 2018

(54) THREAD FORMING DEVICE FOR COMPRESSION MOLDING AND APPARATUS INCORPORATING SAME

(71) Applicant: Jonathon Michael Azzopardi, Ruthven (CA)

(72) Inventor: Jonathon Michael Azzopardi, Ruthven (CA)

( * ) Notice: Subject to any disclaimer, the term of this patent is extended or adjusted under 35 U.S.C. 154(b) by 0 days.

(21) Appl. No.: 15/819,636

(22) Filed: Nov. 21, 2017

(65) Prior Publication Data

US 2018/0099436 A1    Apr. 12, 2018

Related U.S. Application Data

(62) Division of application No. 14/133,608, filed on Dec. 18, 2013, now Pat. No. 9,862,123.

(60) Provisional application No. 61/738,971, filed on Dec. 18, 2012.

(51) Int. Cl.
*B29C 37/00*  (2006.01)
*B29C 43/08*  (2006.01)
*B29C 43/42*  (2006.01)
*B29C 43/50*  (2006.01)

(52) U.S. Cl.
CPC .......... *B29C 37/0021* (2013.01); *B29C 43/08* (2013.01); *B29C 43/42* (2013.01); *B29C 43/50* (2013.01)

(58) Field of Classification Search
CPC .................................. B29C 37/0021
See application file for complete search history.

(56) References Cited

U.S. PATENT DOCUMENTS 3,084,387 A * 4/1963 Tochner .............. B29C 37/0021
                                                    164/314

* cited by examiner

*Primary Examiner* — Larry W Thrower

(57) ABSTRACT

A method of forming a threaded bore in a compression molded part comprises: positioning at least one rotatable threaded shaft in a mold cavity during compression molding of a part; rotatably driving the at least one threaded shaft for unthreading the at least one threaded shaft from the part; and pushing the at least one threaded shaft away from the mold cavity once the at least one threaded shaft is unthreaded from the part.

2 Claims, 8 Drawing Sheets

THREAD FORMING DEVICE FOR COMPRESSION MOLDING AND APPARATUS INCORPORATING SAME

CROSS-REFERENCE TO RELATED APPLICATIONS

This application is a division of U.S. application Ser. No. 14/133,608 filed on Dec. 18, 2013, which claims the benefit of provisional U.S. Application No. 61/738,971 filed on Dec. 18, 2012, the contents of which are incorporated herein by reference in their entireties.

FIELD OF THE INVENTION

The present invention relates generally to compression molding, and in particular to a thread forming device for compression molding and an apparatus incorporating same.

BACKGROUND OF THE INVENTION

Compression molding of shaped composite material products involves compressing polymer resin in a mold under an applied pressure. To form an internal cavity within a compression molded part, it is necessary to provide an additional mold core that is separate from the mold, and that is withdrawn in a direction different from the direction of separation of the mold halves. As will be understood, when the internal cavity includes a threaded surface, the additional mold core cannot be simply axially withdrawn because doing so would interfere with the newly-formed threads.

Several approaches for forming threaded bores during injection molding and compression molding have been described. For example, U.S. Pat. No. 5,135,700 to Williams et al. describes a method and apparatus for molding a product having internal threads that includes a threaded mold core and a device for rotating the mold core about the axis of its threads and for axially withdrawing the core from the mold at a rate that is related to the rate of rotation, according to the pitch of the threads. A cam is rotated in synchronism with the device that rotates the core, and a cam follower displaces the core as the cam is rotated. The cam follower is fixed with respect to the mold. The cam and threaded core are positioned on a carrier, along with the device for rotating the core, such that rotation of the cam displaces the carrier away from the mold. The core is inserted into the mold, prior to the molding process, by displacing the carrier toward the mold without rotating the core. In one embodiment, the cam is rotated by a unidirectional motor such that resetting of the cam after the core is withdrawn is accomplished by forward indexing of the cam a small amount to a zero position.

U.S. Pat. No. 6,602,065 to Ingram describes an apparatus for compression molding plastic closures having a peripheral skirt with an internal thread. The apparatus includes a first mold assembly having a male mold core and a second mold assembly having a female mold cavity. At least one of the first and second mold assemblies is moved relative to the other to bring the male mold core into the female mold cavity for compression molding a closure, and then is moved to open the cavity such that the closure is retained on the male mold core. The male mold core is rotated relative to the first mold assembly to unthread the core from within the closure, and thereby strip the closure from the core, without stretching the closure skirt over the core or wiping the internal thread over the external surface of the mold core.

Improvements are generally desired. It is therefore an object of the present invention at least to provide a novel thread forming device for compression molding and apparatus incorporating same.

SUMMARY OF THE INVENTION

Accordingly, in one aspect there is provided a thread forming device for compression molding, comprising: a base positioned adjacent a compression molding device; a plurality of posts extending from the base; a carrier moveable along the posts and supporting at least one rotatable threaded shaft, each shaft being configured for forming a threaded bore during compression molding of a part; an assembly for rotatably driving the at least one threaded shaft for unthreading the at least one threaded shaft from the part; and one or more biasing members configured to push the carrier away from the base once the at least one threaded shaft is unthreaded from the part.

The device may further comprise: a push block moveable along the posts, the push block being configured to push the carrier toward the base for inserting the at least one threaded shaft into the compression molding device. The device may further comprise an actuator coupled to the push block for moving the push block along the posts. The device may further comprise a support block mounted to an end of said posts and supporting the actuator. The actuator may be a hydraulic actuator.

The assembly may comprise a hydraulic motor. The hydraulic motor may be mounted on the carrier. The assembly may comprise a gear box configured for coupling the hydraulic motor to the at least one threaded shaft.

The at least one rotatable threaded shaft may comprise two rotatable threaded shafts.

Each threaded shaft may comprise a threaded portion, and a tapered portion adjacent the threaded portion. The device may further comprise a sleeve comprising at least one tapered stop for providing a surface against which the tapered portion of each threaded shaft abuts.

In one embodiment, there is provided a compression molding apparatus, comprising: a compression molding device; and the above-described thread forming device coupled thereto.

In another aspect, there is provided a method of forming a threaded bore in a compression molded part, comprising: positioning at least one rotatable threaded shaft in a mold cavity during compression molding of a part; rotatably driving the at least one threaded shaft for unthreading the at least one threaded shaft from the part; and pushing the at least one threaded shaft away from the mold cavity once the at least one threaded shaft is unthreaded from the part.

The method may further comprise pushing the at least one rotatable threaded shaft into the mold cavity prior to said compression molding of the part.

BRIEF DESCRIPTION OF THE DRAWINGS

Embodiments will now be described more fully with reference to the accompanying drawings in which.

DETAILED DESCRIPTION OF THE EMBODIMENTS

Figure 1:
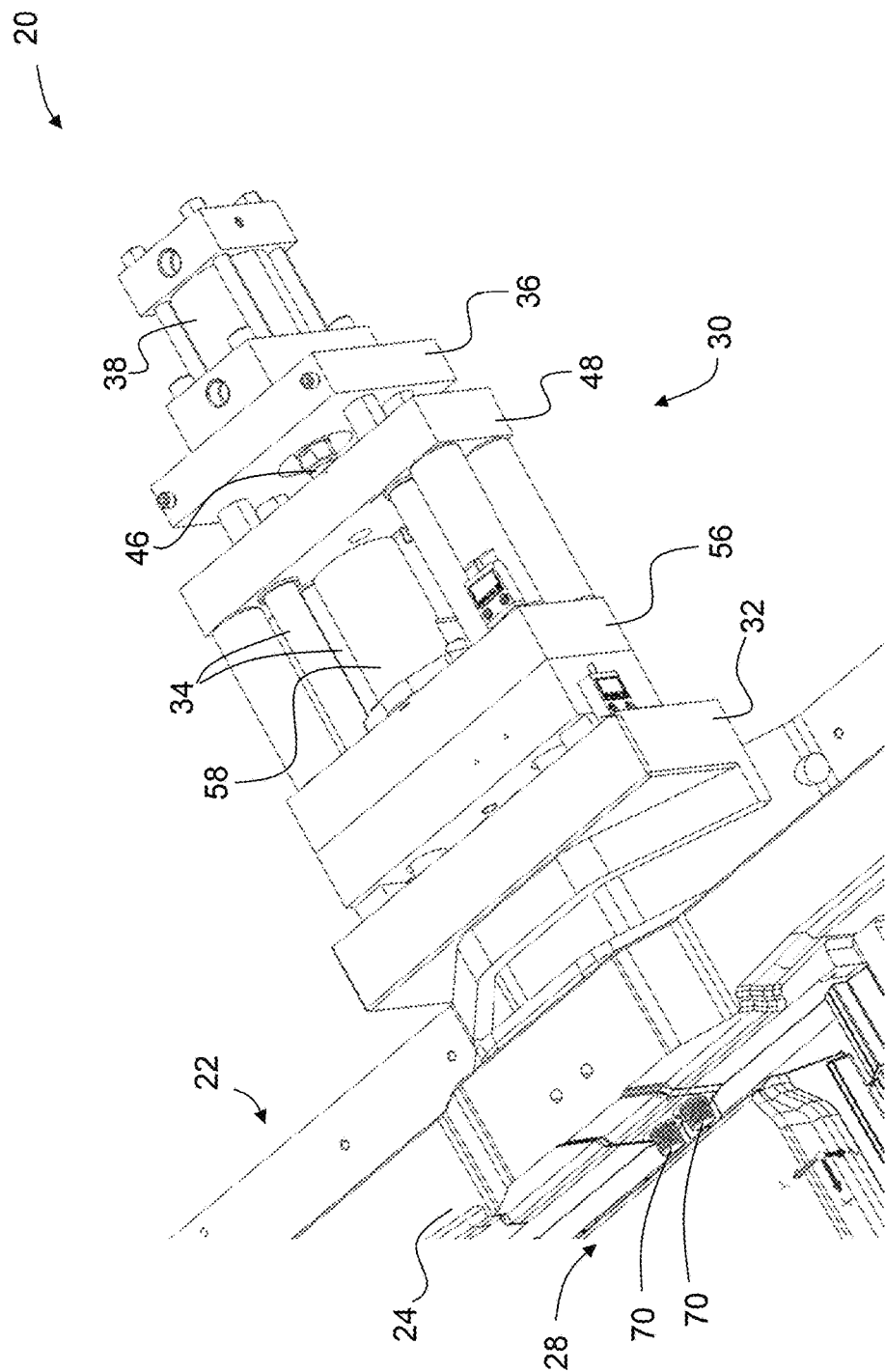
FIG. 1 is a perspective view of a portion of a compression molding apparatus.
Figure 2:
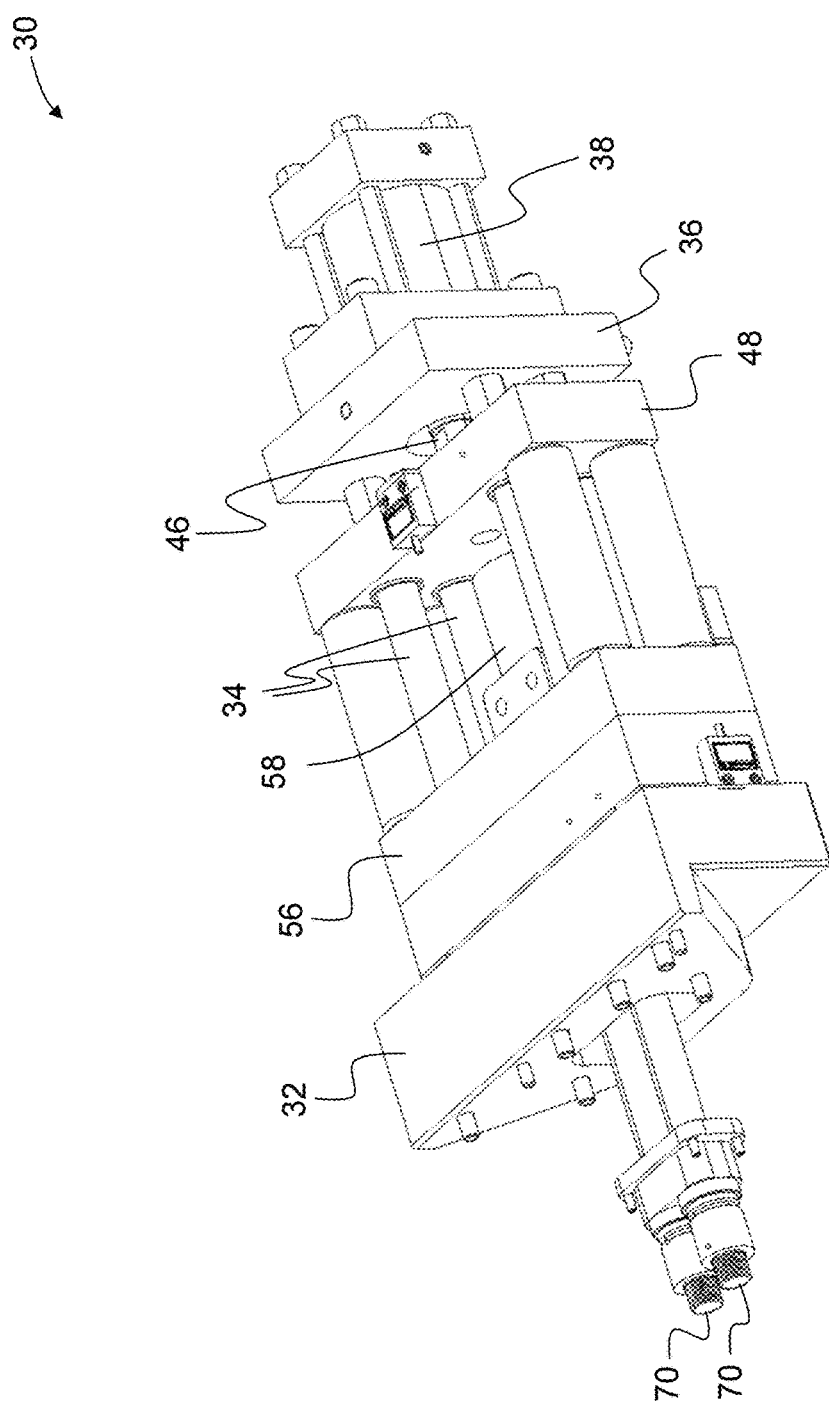
FIG. 2 is a perspective view of a thread forming device forming part of the compression molding apparatus of FIG. 1.

Turning now to FIG. 1, a compression molding apparatus is shown and is generally indicated by reference numeral 20. Apparatus 20 comprises a compression molding device 22 that has a first mold half 24 and a second mold half (not shown), which cooperate to define a mold cavity 28. The shape of the mold cavity 28 is selected so as to produce a compression molded part having a corresponding desired shape, as is known in the art.

Apparatus 20 further comprises a thread forming device 30 that is coupled to the compression molding device 22, and which is configured to produce one or more threaded bores within the compression molded part. The thread forming device 30 may be better seen in FIGS. 2 to 6. Thread forming device 30 has a longitudinal body comprising a base 32 that is configured to be mounted to the compression molding device 22, a set of parallel posts 34 extending from the base 32, and a support block 36 mounted to the ends of the posts 34 distal from the base 32. In the embodiment shown, the thread forming device 30 comprises four (4) posts 34. Mounted to the support block 36 is an actuator 38, which is in communication with a first set of hydraulic lines (not shown). The hydraulic lines are in communication with a supply of a pressurized hydraulic fluid (not shown) and a controller (not shown). The controller and the hydraulic lines are configured to supply pressurized hydraulic fluid in a controlled manner to the actuator 38 for controlled operation thereof. The actuator 38 has a push rod 46 that extends therefrom towards the base 32 and the mold cavity 28. A distal end of the push rod 46 is connected to a moveable push block 48, which is configured to slide linearly along the posts 34 in unison with the push rod 46. In the example shown, the push block 48 comprises a planar block having four columns fastened thereto, so as to form a block having a generally "C-shape".

Figure 3:
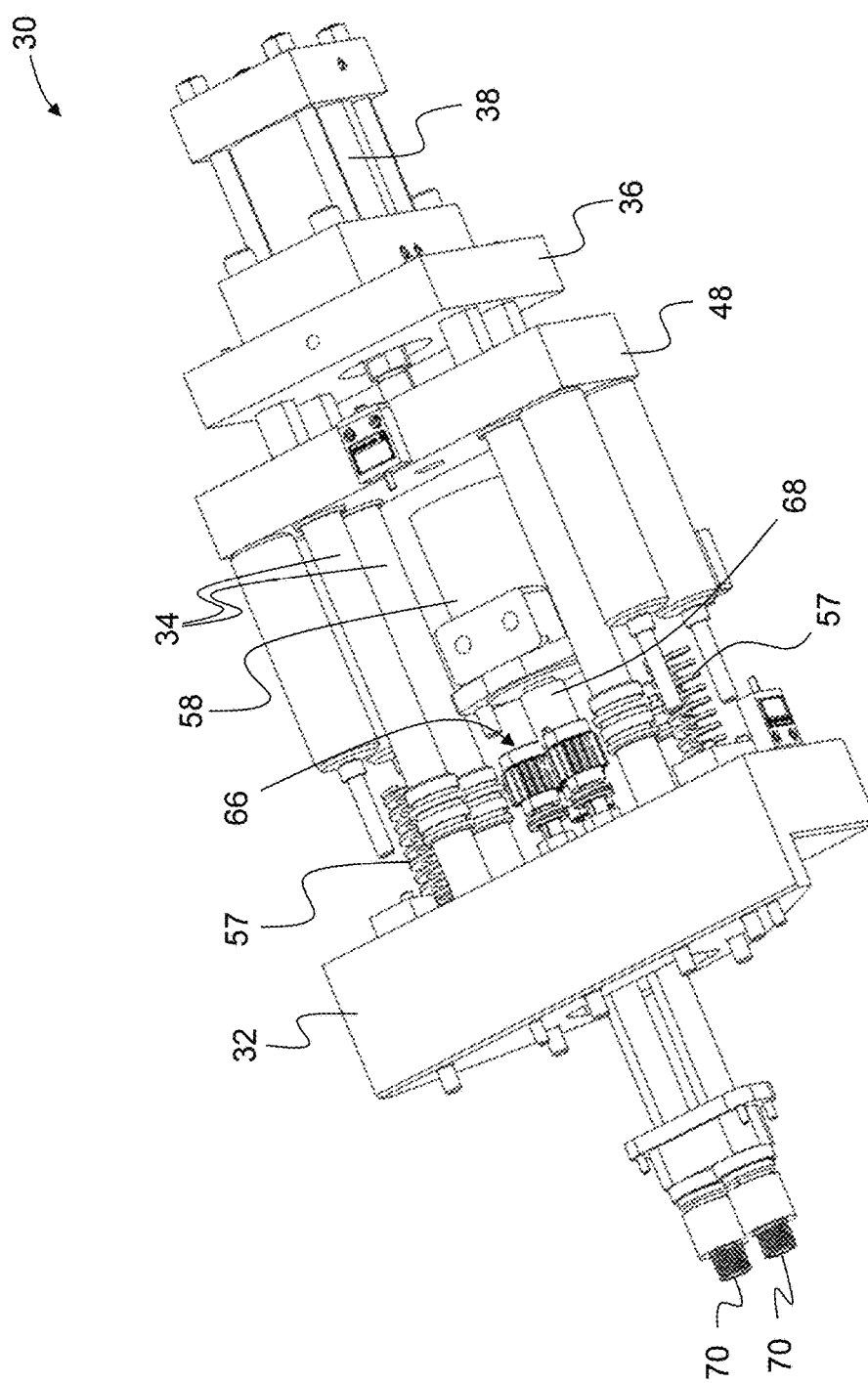
FIG. 3 is a perspective view of a portion of the thread forming device of FIG. 2.

The thread forming device 30 also comprises a moveable carrier 56, which is also configured to slide linearly along the posts 34. Positioned between the carrier 56 and the base 32, and accommodated within respective recesses (not shown) within the carrier 56 and the base 32, are one or more return springs 57, which provide a biasing force urging the carrier 56 away from the base 32. Mounted on the carrier 56 is a hydraulic motor 58, which is in communication with a second set of hydraulic lines (not shown). The hydraulic lines are in communication with the supply of pressurized hydraulic fluid and the controller, and the controller and the second set of hydraulic lines are configured to supply pressurized hydraulic fluid in a controlled manner to the hydraulic motor 58 for controlled operation thereof. The carrier 56 also comprises a gear box 66 that is mechanically coupled to a drive shaft 68 of the hydraulic motor 58, as shown in FIG. 3 in which carrier 56 is not included. The gear box 66 is also mechanically coupled to at least one rotatable threaded shaft 70. In this embodiment, the thread forming device 30 comprises two (2) rotatable threaded shafts 70. As will be understood, rotation of each threaded shaft 70 is caused by rotation of the drive gear of the hydraulic motor 58 via the gear box 66.

Figure 4:
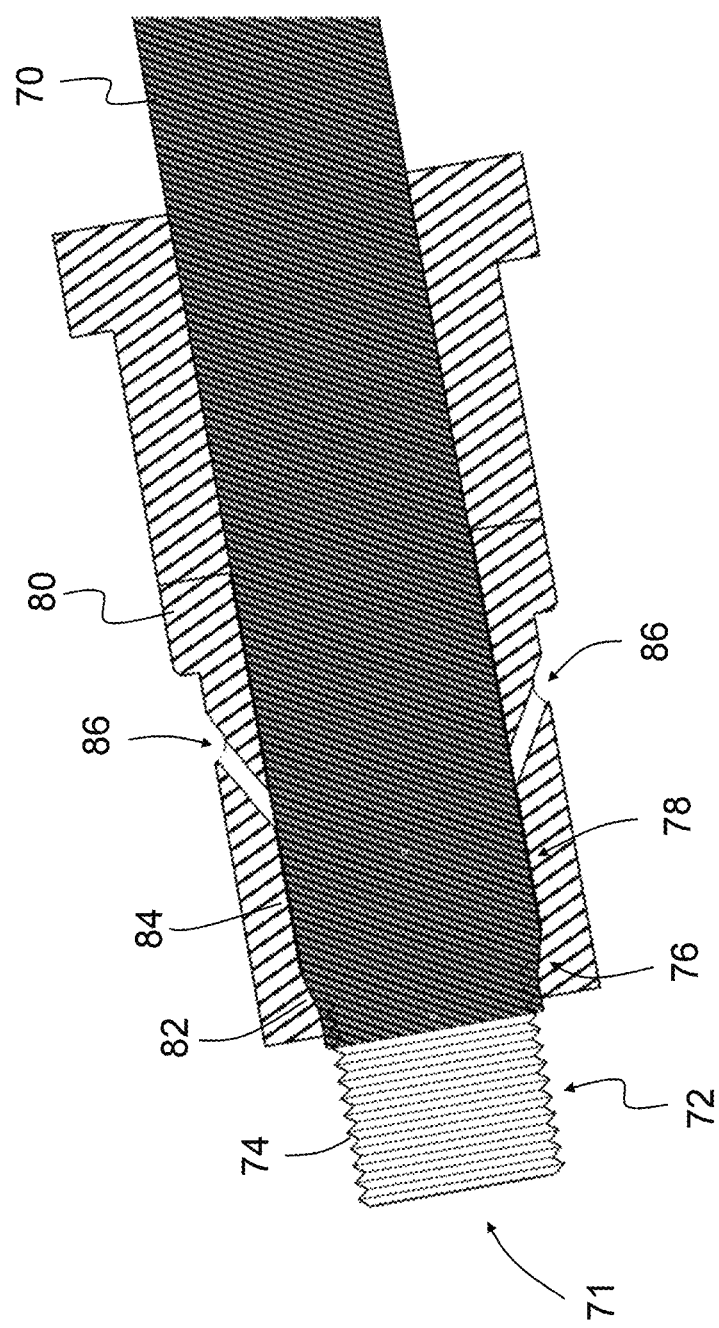
FIG. 4 is sectional side view of a portion of the thread forming device of FIG. 2.
Figure 5:
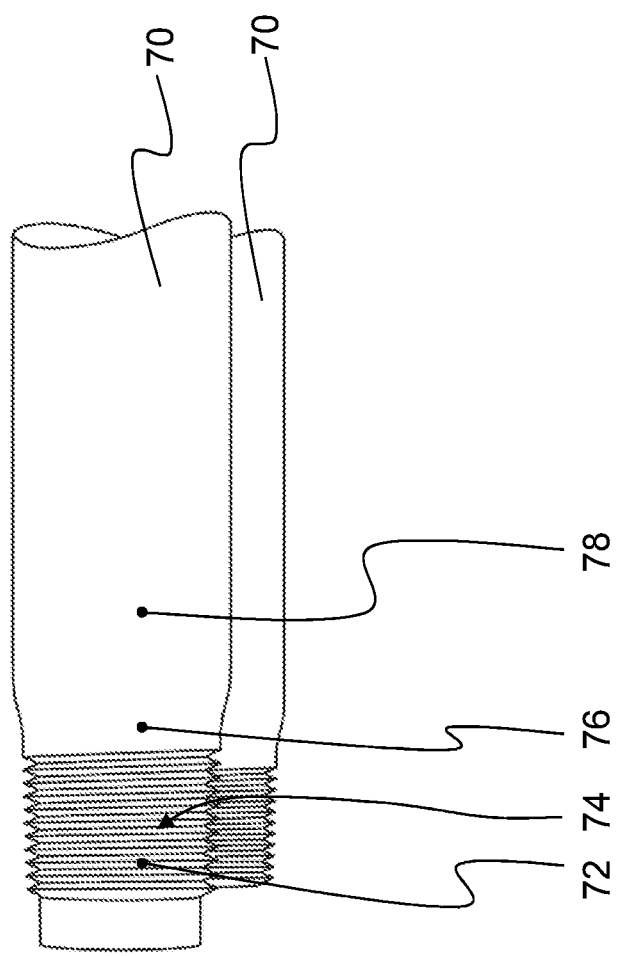
FIG. 5 is a schematic view of portions of two threaded shafts forming part of the thread forming device of FIG. 2.

The threaded shaft 70 may be better seen in FIGS. 4 and 5. Each threaded shaft 70 has a free end 71 that is sized and shaped to form a corresponding threaded bore in the compression molded part, and within the mold cavity 28, during compression molding. The threaded shaft 70 comprises a threaded portion 72 adjacent the free end 71 having one or more screw threads 74 disposed on a surface thereof. Each threaded shaft 70 further comprises a tapered portion 76 adjacent to the threaded portion 72, and a cylindrical portion 78 adjacent to the tapered portion 76.

Each threaded shaft 70 is accommodated within a respective sleeve 80 that is positioned within the molding device 22. In this embodiment, the sleeve 80 forms part of the first mold half 24. The sleeve 80 comprises a tapered stop 82 that is shaped to provide a surface against which the tapered portion 76 of the threaded shaft 70 abuts. The sleeve 80 further comprises a straight portion 84 adjacent to the tapered stop 82. The sleeve also comprises one or more venting bores 88 through which excess material or debris resulting from operation of the thread forming device 30 may be discharged. Additionally, the thread forming device 30 comprises a cylindrical bushing (not shown) adjacent to the sleeve 80 for supporting rotational and axial movement of the threaded shaft 70.

During operation, the first mold half 24 and second mold half are brought together, so as to close the compression molding device 22 and to define the mold cavity 28. The actuator 38 is then operated by pressurized hydraulic fluid supplied through the first set of hydraulic lines, causing the push rod 46 to extend from the actuator 38, in turn pushing the push block 48 along the posts 34 toward the base 32. During extension of the push rod 46, the push block 48 abuts against the carrier 56 and pushes the carrier 56 along the posts 34 toward the base 32, and against the opposing force provided by the return springs 57. Extension of the push rod 46, and unified movement of the push rod 46, the push block 48 and the carrier 56, continues until the tapered portions 76 of the threaded shafts 70 abut against the tapered stops 82 of the sleeves 80. Once in this position, shown in FIG. 6a, the threaded portion 72 of each threaded shaft 70 is located at its desired position within the mold cavity 28. The actuator 38 remains actuated during formation of the compression molded part, such that the threaded shafts 70 remain fixed in position against the high counteracting pressure used during the compression molding process.

The compression molded part is then formed within the mold cavity 28 in the conventional manner known in the art. As will be understood, the compression molded part is formed around the threaded portion 72 of each threaded shaft 70, such that each threaded portion 72 forms a corresponding threaded bore within the compression molded part.

Figure 6A:
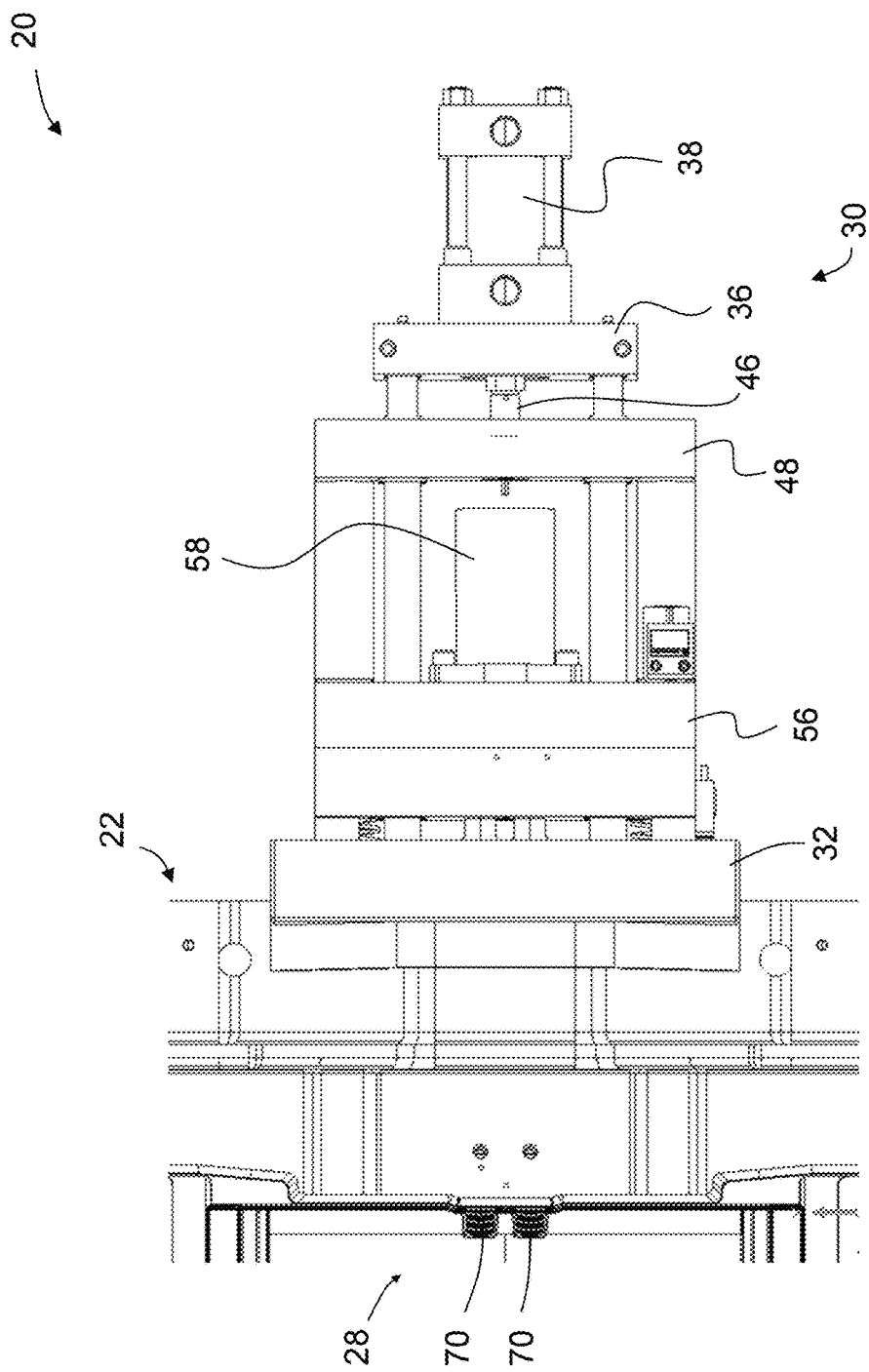
FIGS. 6a to 6c are top views of the portion of the compression molding apparatus of FIG. 1, during operation.
Figure 6B:
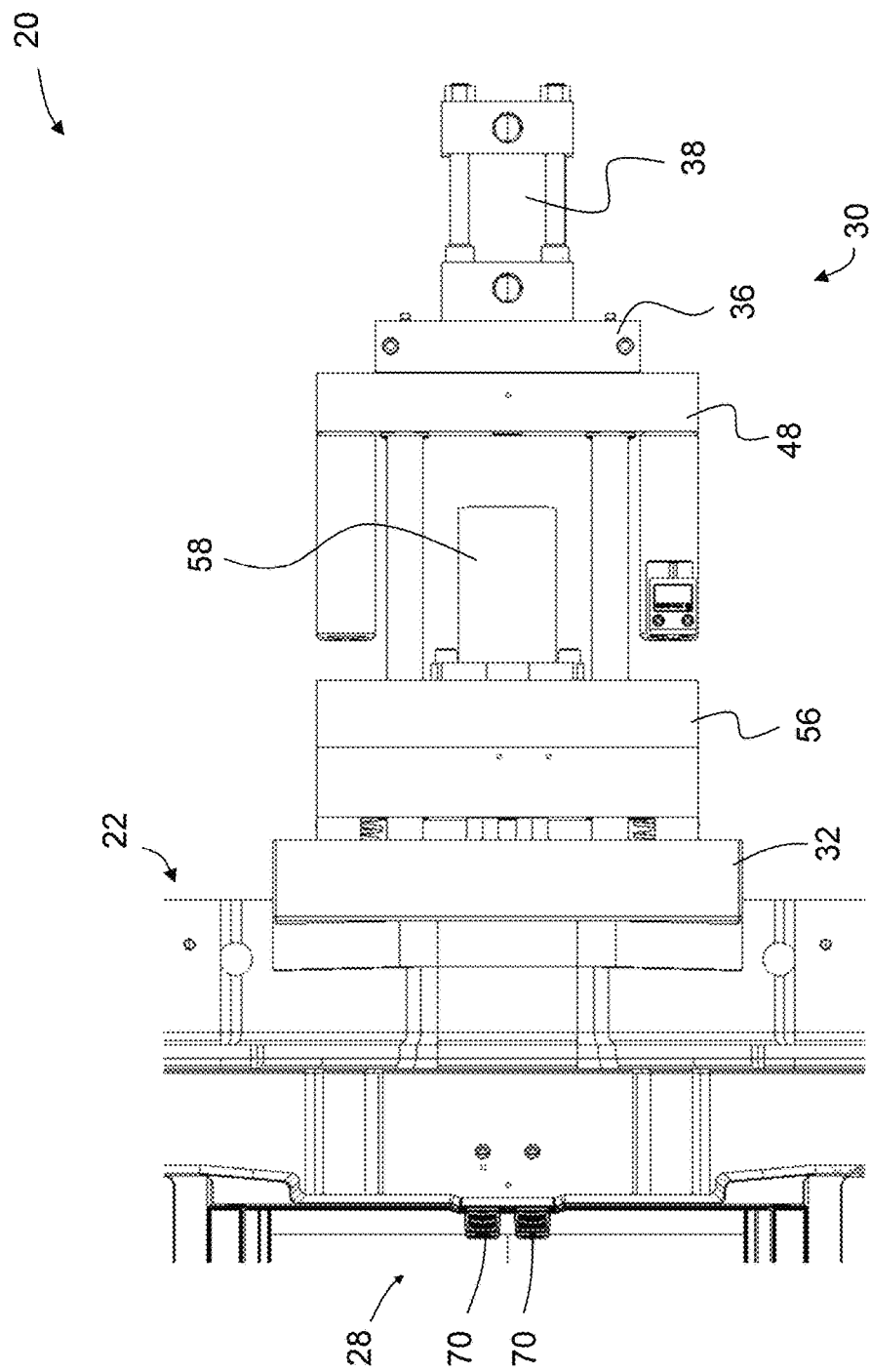
Figure 6C:
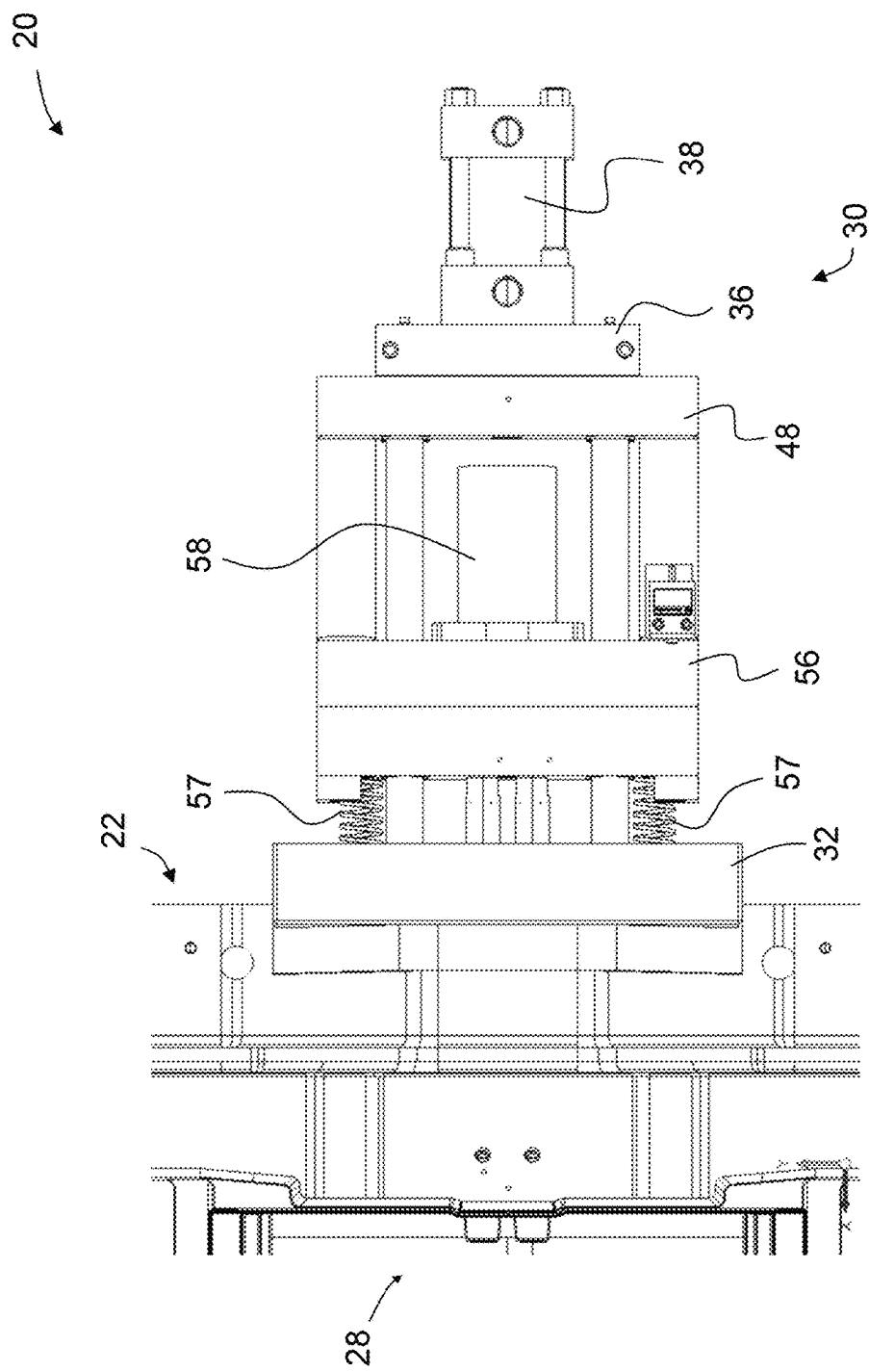

After the compression molded part has been formed, the actuator 38 is deactivated by release of pressurized hydraulic fluid therefrom. As a result, the push rod 46 is retracted into the actuator 38, pulling the push block 48 along the posts 34 and away from the carrier 56 until the push block 48 abuts against the support block 36, as shown in FIG. 6b. The hydraulic motor 58 is then operated by pressurized hydraulic fluid supplied through the second set of hydraulic lines, which in turn causes the threaded shafts 70 to be rotated via the gear box 66. The direction of rotation of each threaded shaft 70 is selected such that, owing to the handedness of the screw threads 74, the rotating threaded shafts 70 together with the carrier 56 are caused to be backed away from the compression molded part within the molding cavity 28. Once the screw threads 74 of the threaded shafts 70 are clear of the threads of the threaded bores within the compression molded part, the carrier 56 and the rotating threaded shafts 70 are pushed by the opposing force provided by the return springs 57 to abut against the push block 48, as shown in FIG. 6c. With the carrier 56 in this position, operation of the hydraulic motor 58 is then stopped. The molding device 22 may then be opened, and the compression molded part may be removed without the threaded shafts 70 interfering with its removal.

Although in the embodiment described above, the thread forming device comprises two (2) rotatable threaded shafts, in other embodiments, the thread forming device may alternatively comprise one (1) rotatable threaded shaft or more than two (2) rotatable threaded shafts.

Although embodiments have been described above and with reference to the accompanying drawings, those of skill in the art will appreciate that variations and modifications may be made without departing from the scope of the invention.

What is claimed is:

1. A method of forming a threaded bore in a compression molded part, comprising:

positioning at least one rotatable threaded shaft in a mold cavity during compression molding of a part, each shaft having a respective longitudinal axis and being rotatable about the axis, and each shaft having a threaded portion for forming a respective threaded bore;

rotatably driving the at least one threaded shaft about its respective axis for unthreading the at least one threaded shaft from the part; and pushing the at least one threaded shaft away from the mold cavity once the at least one threaded shaft is unthreaded from the part.

2. The method of claim 1, further comprising pushing the at least one rotatable threaded shaft into the mold cavity prior to said compression molding of the part.

* * * * *